United States Patent [19]
Jensen

[11] Patent Number: 5,642,955
[45] Date of Patent: Jul. 1, 1997

[54] STRONGBACK FOR REMOTELY INSTALLING TIE ROD ASSEMBLY IN ANNULUS BELOW CORE SPRAY PIPING IN BOILING WATER REACTOR

[75] Inventor: Grant Clark Jensen, Morgan Hill, Calif.

[73] Assignee: General Electric Company, San Jose, Calif.

[21] Appl. No.: 532,945

[22] Filed: Sep. 22, 1995

[51] Int. Cl.$^6$ .................................................. G21C 19/00
[52] U.S. Cl. ........................... 403/24; 403/205; 376/260; 376/285
[58] Field of Search ..................... 376/260, 285, 376/287, 302; 403/205, 403, 265, 270, 271, 24, 31, 157, 272, 322, 325; 52/127.1, 127.2

[56] References Cited

U.S. PATENT DOCUMENTS

| | | | |
|---|---|---|---|
| 3,987,860 | 10/1976 | Jabsen | 376/302 |
| 4,068,427 | 1/1978 | Camardo | 52/127.2 X |
| 4,079,556 | 3/1978 | Luck et al. | 52/127.2 |
| 4,326,920 | 4/1982 | Facha et al. | 376/285 X |
| 4,489,659 | 12/1984 | Kamohara et al. | 403/205 X |
| 4,504,437 | 3/1985 | Underwood et al. | 376/285 X |
| 4,596,689 | 6/1986 | Gorholt et al. | 376/285 X |
| 4,836,485 | 6/1989 | Cooper | 403/157 X |
| 5,320,403 | 6/1994 | Kazyak | 403/205 X |
| 5,502,754 | 3/1996 | Erbes | 376/285 X |
| 5,521,950 | 5/1996 | Whitling | 376/260 |

*Primary Examiner*—Harry C. Kim
*Attorney, Agent, or Firm*—James E. McGinness

[57] ABSTRACT

A strongback for lowering a tie rod into the downcomer annulus of a boiling water reactor during a shroud repair operation. The tie rod strongback is suspended from a cable via a cable adaptor at its upper end. The lower end of the strongback is coupled to a tie rod adaptor, which in turn couples to the top of the tie rod. The strongback is a welded assembly of square tubes, channels for reinforcing the joints of the welded tubes, and upper and lower couplings. In particular, the strongback has mutually parallel first and second rigid linear members which are disposed vertically when the strongback is suspended from a plumb cable. The second rigid linear member is connected to the first rigid linear member by a relatively obliquely disposed third rigid linear member. The first and second rigid linear members lie in a vertical plane which is offset from the axis of a plumb cable to allow the strongback assembly to circumvent the core spray downcomer piping when the tie rod/lower spring assembly is in its final position in the annulus. The first rigid linear member is further offset from the second rigid linear member cable axis to allow the strongback assembly to circumvent the feedwater sparger and the core spray header. This facilitates proper positioning of the bottom of the tie rod/lower spring assembly relative to the gusset plate to which the assembly will be anchored.

13 Claims, 8 Drawing Sheets

STRONGBACK FOR REMOTELY INSTALLING TIE ROD ASSEMBLY IN ANNULUS BELOW CORE SPRAY PIPING IN BOILING WATER REACTOR

FIELD OF THE INVENTION

This invention relates to tooling which is useful in installing hardware in a nuclear reactor. In particular, the invention relates to tooling for installing hardware for stabilizing the core shroud of a nuclear reactor to resist deflection in response to a seismic event and/or loss-of-coolant accident (LOCA).

BACKGROUND OF THE INVENTION

Figure 1:
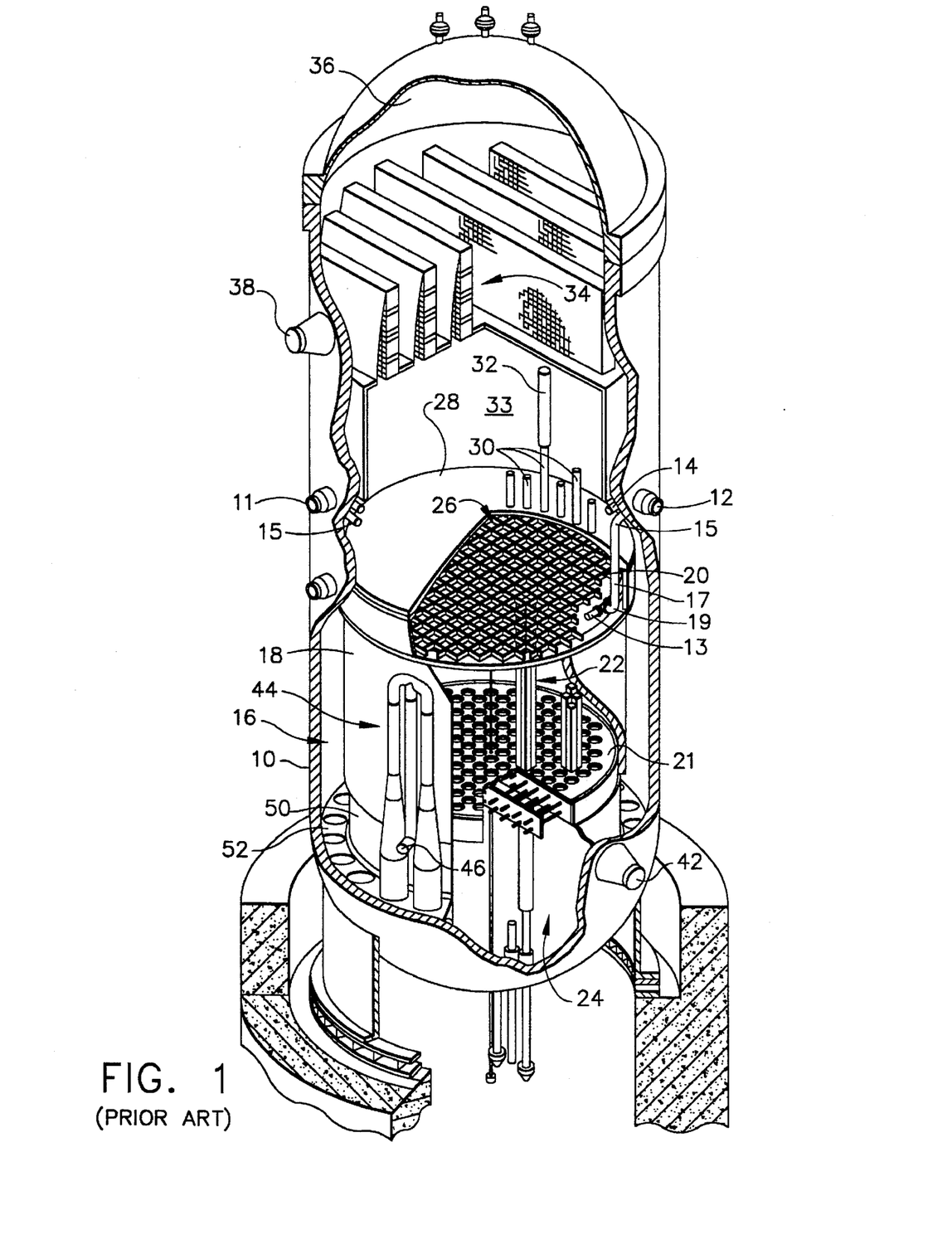
FIG. 1 is a schematic showing a partially cutaway isometric view of a conventional BWR.

A conventional boiling water reactor (BWR) is shown in FIG. 1. Feedwater is admitted into a reactor pressure vessel 10 via a feedwater inlet 12 and a feedwater sparger 14, which is a ring-shaped pipe having suitable apertures for circumferentially distributing the feedwater inside the reactor pressure vessel (RPV). The feedwater from sparger 14 flows downwardly through the downcomer annulus 16, which is an annular region between RPV 10 and core shroud 18. In addition, a core spray inlet 11 supplies water to a core spray sparger 13 (located inside the shroud 18) via core spray header 15, core spray downcomer piping 17 and core spray elbow 19 (which penetrates the shroud wall). The core spray header 15 has a circular section that occupies space directly underneath feedwater sparger 14.

Core shroud 18 is a stainless steel cylinder surrounding the nuclear fuel core. The core is made up of a plurality of fuel bundle assemblies 22 (only two 2×2 arrays of which are shown in FIG. 1). Each array of fuel bundle assemblies is supported at the top by a top guide 20 and at the bottom by a core plate 21. The core top guide 20 provides lateral support for the top of the fuel assemblies and maintains the correct fuel channel spacing to permit control rod insertion.

The water flows through downcomer annulus 16 to the core lower plenum 24. The water subsequently enters the fuel assemblies 22, wherein a boiling boundary layer is established. A mixture of water and steam enters core upper plenum 26 under shroud head 28. Vertical standpipes 30 atop shroud head 28 are in fluid communication with core upper plenum 26. The steam-water mixture flows through standpipes 30 and enters steam separators 32, which are of the axial-flow centrifugal type. The separated liquid water then mixes with feedwater in the mixing plenum 33, which mixture then returns to the core via the downcomer annulus. The steam passes through steam dryers 34 and enters steam dome 36. The steam is conducted from the RPV via steam outlet 38.

The BWR also includes a coolant recirculation system which provides the forced convection flow through the core necessary to attain the required power density. A portion of the water is pumped from the lower end of the downcomer annulus 16 via recirculation water outlet 42 and forced by a centrifugal recirculation pump (not shown) into jet pump assemblies 44 (only one of which is shown) via recirculation water inlets 46. The BWR has two recirculation pumps, each of which provides the driving flow for a plurality of jet pump assemblies. The jet pump assemblies are circumferentially distributed around the core shroud 18.

The core shroud 18 (shown in more detail in FIG. 2) in one type of BWR comprises a shroud head flange 18a for supporting the shroud head 28; a circular cylindrical upper shroud wall 18b having a top end welded to shroud head flange 18a; an annular top guide support ring 18c welded to the bottom end of upper shroud wall 18b; a circular cylindrical middle shroud wall comprising three sections 18d, 18e and 18f welded in series, with a top end of section 18d being welded to top guide support ring 18c; and an annular core plate support ring 18g welded to the bottom end of middle shroud wall section 18f and to the top end of a lower shroud wall 18h. The entire shroud is supported by a shroud support 50, which is welded to the bottom of lower shroud wall 18h, and by annular shroud support plate 52, which is welded at its inner diameter to shroud support 50 and at its outer diameter to RPV 10.

Figure 2:
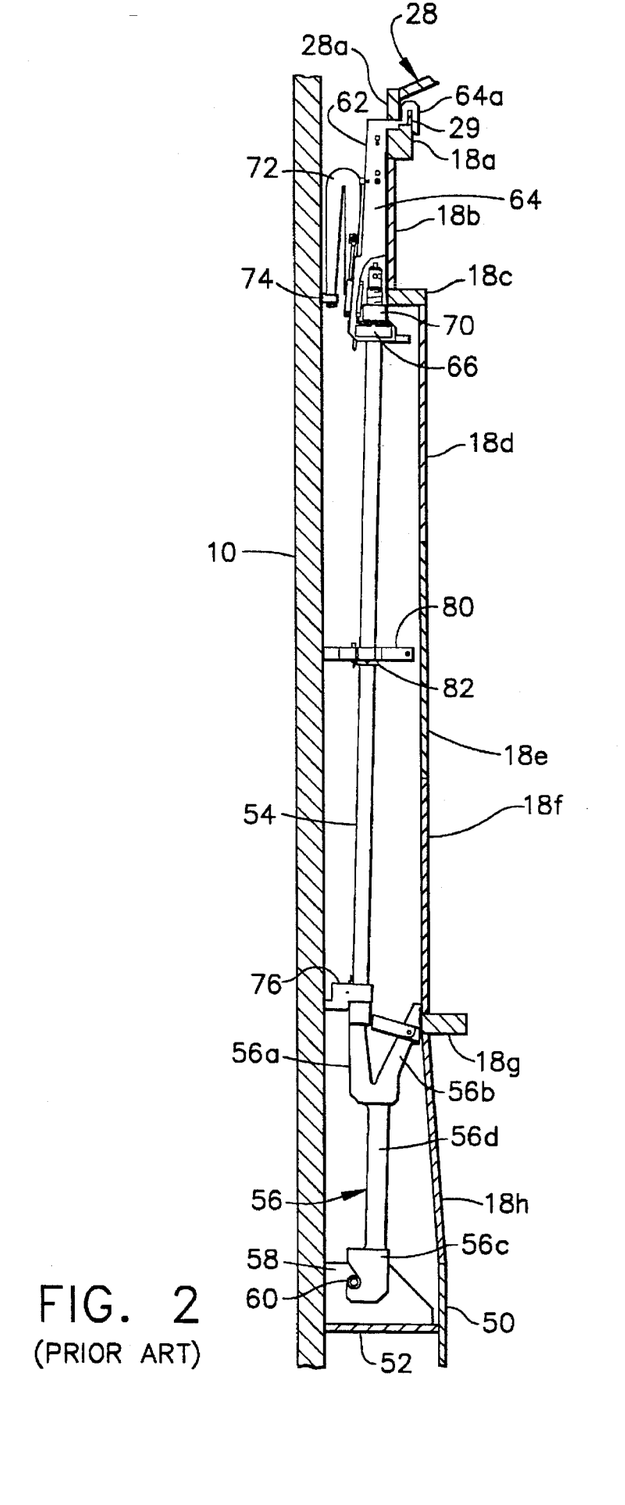
FIG. 2 is a sectional elevational view of core shroud repair hardware comprising a tie rod/lower spring assembly for vertically restraining the shroud and wishbone springs for laterally restraining the shroud at the elevations of the top guide support ring and the core plate.

In the event of a seismic disturbance, it is conceivable that the ground motion will be translated into lateral deflection relative to the reactor pressure vessel of those portions of the shroud located at elevations above shroud support plate 52. Such deflections would normally be limited by acceptably low stresses on the shroud and its weldments. However, if the shroud weld zones have failed due to stress corrosion cracking, there is the risk of misalignment and damage to the core and the control rod components, which would adversely affect control rod insertion and safe shutdown.

Stress corrosion cracking in the heat affected zone of any shroud girth seam welds diminishes the structural integrity of shroud 18, which vertically and horizontally supports the core top guide 20 and the shroud head 28. In particular, a cracked shroud increases the risks posed by a loss-of-coolant accident (LOCA). During a LOCA, the loss of coolant from RPV 10 produces a loss of pressure above the shroud head 28 and an increase in pressure inside the shroud 18, i.e., underneath shroud head 28. The result is an increased lifting force on shroud head 28 and on the upper portions of the shroud to which the shroud head is bolted. If the core shroud has fully cracked girth welds, the lifting forces produced during a LOCA could cause the shroud to separate along the areas of cracking, producing undesirable leaking of reactor coolant.

A known repair method for vertically restraining a weakened core shroud utilizes tensioned tie rods 54 coupled to the shroud flange 18a and to the shroud support plate 52, as seen in FIG. 2. The lower end of the tie rod/lower spring assembly hooks underneath a clevis pin 60 inserted in a hole machined into gusset plate 58, which plate is in turn welded to shroud support plate 52 and RPV 10. In addition, the shroud 18 is restrained laterally by installation of wishbone springs 56a/56b and 72, which are components of the shroud repair assembly.

Referring to FIG. 2, the shroud restraint tie rod/lower spring assembly comprises a tie rod 54 having a circular cross section. A lower end of tie rod 54 is anchored in a threaded bore formed in the end of a spring arm 56a of a lower spring 56. Tie rod 54 extends from the end of spring arm 56a to a position adjacent the outer circumferential surface of the top guide support ring 18c. The upper end of tie rod 54 has a threaded portion.

The lower spring 56 is anchored to a gusset plate 58 attached to the shroud support plate 52. The lower spring 56 has a slotted end which straddles gusset plate 58 and forms a clevis hook 56c. The clevis hooks under opposite ends of a clevis pin 60 inserted through a hole machined in the gusset plate 58. Engagement of the slotted end with the gusset plate 58 maintains alignment of lower spring 56 under the action of seismic motion of the shroud, which may be oblique to the spring's radial orientation.

The tie rod 54 is supported at its top end by an upper support assembly 62 which hangs on the shroud flange 18a. A pair of notches or slots are machined in the shroud head ring 28a of shroud head 28. The notches are positioned in alignment with a pair of bolted upper support plate segments 64 of upper support assembly 62 when the shroud head 28 is properly seated on the top surface of shroud flange 18a. These notches facilitate coupling of the tie rod/lower spring assembly to the shroud flange.

The pair of notches at each tie rod azimuthal position receive respective hook portions 64a of the upper support plates 64. Each hook 64a conforms to the shape of the top surface of shroud flange 18a and the shape of the steam dam 29. The distal end of hook 64a hooks on the inner circumference of shroud dam 29.

The upper support plates 64 are connected in parallel by a top support bracket (not shown) and a support block 66 which forms the anchor point for the top of the tie rod. Support block 66 has an unthreaded bore, tapered at both ends, which receives the upper end of tie rod 54. After the upper end of tie rod 54 is passed through the bore, a threaded tensioning nut 70 is screwed onto the upper threaded portion 54a (see FIG. 4) of tie rod 54.

As seen in FIG. 2, the assembly comprised of support plates 64 with hooks 64a, support block 66, tie rod 54, lower spring 56, clevis pin 60 and gusset plate 58 form a vertical load path by which the shroud flange 18a is connected to the shroud support plate 52. In the tensioned state, the upper support plates 64 exert a restraining force on the top surface of shroud flange 18a which opposes separation of the shroud 18 at any assumed failed circumferential weld location.

Lateral restraint at the elevation of the top guide support ring 18c is provided by an upper spring 72 having a double cantilever "wishbone" design. The end of the radially outer arm of upper spring 72 has an upper contact spacer 74 rotatably mounted thereon which bears against the inner surface of the wall of RPV 10.

A spring arm 56a of lower spring 56 laterally supports the shroud 18 at the core plate support ring 18g, against the vessel 10, via a lower contact spacer 76. The top end of spring arm 56a has a threaded bore to provide the attachment for the threaded bottom end 54b (see FIG. 4) of tie rod 54. The member 56d connecting the upper wishbone spring 56a, 56b to clevis hook 56c is offset from the line of action between the lower end of tie rod 54 and clevis pin 60 to provide a vertical spring compliance in the load path to the tie rod.

Figure 4:
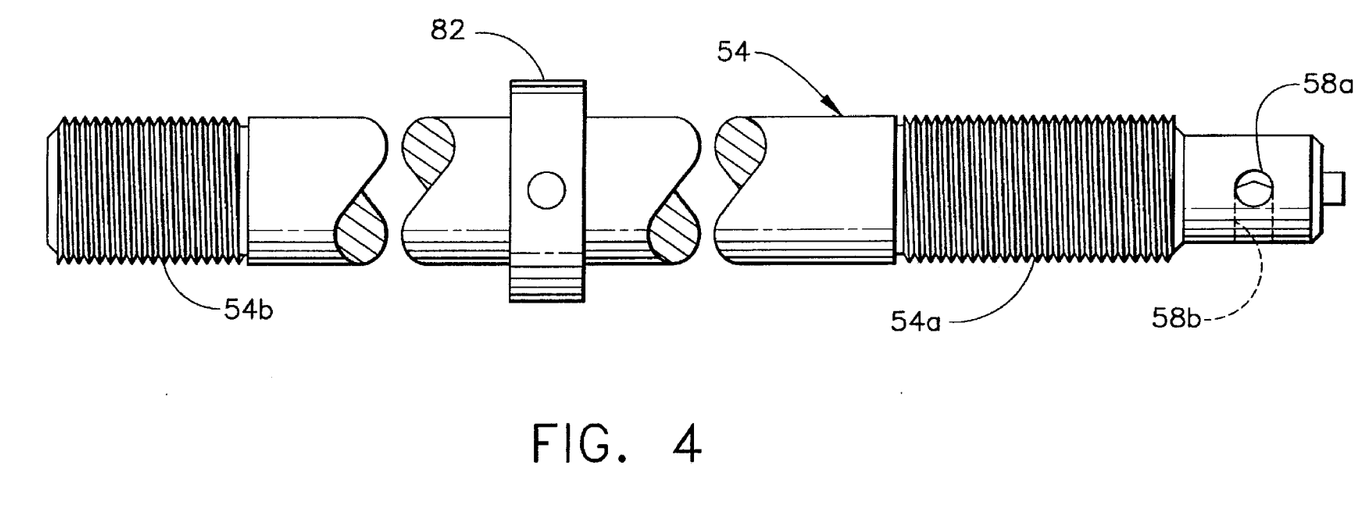
FIG. 4 is an elevation view of the upper end of the tie rod incorporated in the shroud repair assembly shown in FIG. 2.

A middle support 80 is preloaded against the vessel wall at assembly by radial interference which bends the tie rod 54, thereby providing improved resistance to vibratory excitation failure of the tie rod. The middle support also provides a lateral motion limit stop for the shroud central shell, in the event of complete failure of its girth welds. To facilitate mounting of the middle support 80, a mid-support ring 82 is secured to the tie rod 54, as shown in FIG. 4. The middle support 80 has a section of an annular recess counterbored in its bottom which form fits on ring 82, thereby preventing lateral shifting of middle support 80 relative to tie rod 54. The middle support 80 is latched to midsupport ring 82 by a wishbone spring latch (not shown), which blocks upward vertical displacement of middle support 80 relative to tie rod 54.

During installation of the shroud repair hardware shown in FIG. 2, the tie rod/lower spring assembly comprising tie rod 54 screwed into lower spring 56 is suspended from a cable and lowered into the annulus to the desired elevation. Only after clevis hook 56c has been hooked under clevis pin 60 and the tie rod/lower spring assembly has been braced in the hooked position will the upper support assembly 62 be installed, followed by upper spring 72.

As the cable is lowered, the tie rod/lower spring assembly must be guided into the narrow space between adjacent jet pump assemblies. However, in some BWRs this installation site lies below the feedwater sparger, core spray header and core spray downcomer piping, which lie in the path of a descending tie rod suspended from an overhead crane. To protect the feedwater sparger and core spray header from damage due to impact by the descending tie rod/lower spring assembly, which weighs in excess of 1,000 pounds, a cover is hooked onto the feedwater sparger to deflect the tie rod away from the feedwater sparger and core spray header. However, the cover obstructs the cable so that the tie rod/lower spring assembly does not hang plumb from the crane. This makes it difficult to maneuver a suspended tie rod/lower spring assembly into the correct position in the downcomer annulus. In particular, unless appropriate steps are taken, the cover will obstruct the taut cable from becoming oriented vertical and limit radially outward movement of the cable at the point of contact and tie rod/lower spring assembly suspended therefrom. Also the friction between the taut cable and the cover impedes tangential movement of the suspended tie rod/lower spring assembly. As a result, the azimuthal and radial positions of the tie rod/lower spring assembly cannot be controlled by moving the crane to a corresponding position overhead, preventing placement of the suspended tie rod/lower spring assembly at the precise position required for coupling to the gusset plate.

SUMMARY OF THE INVENTION

The present invention is a strongback for lowering a tie rod into the downcomer annulus of a boiling water reactor during a shroud repair operation. The tie rod strongback is suspended from a cable via a cable adaptor at its upper end. The lower end of the strongback is coupled to a tie rod adaptor, which in turn couples to the top of the tie rod. The strongback is designed to circumvent the piping obstructions so that the tie rod/lower spring assembly is freely suspended from the end of the cable and the cable remains plumb.

In accordance with the preferred embodiment of the invention, the upper coupling of the strongback is an apertured plate which can be attached to an apertured clevis of the cable adaptor by means of a first clevis pin, and the lower coupling of the strongback is an apertured clevis which can be attached to an apertured plate of the tie rod adaptor by means of a second clevis pin. The first and second clevis pins are preferable mutually parallel. In this case, a line perpendicular to the clevis pins and intersecting the axes of both clevis pins defines a reference axis, which will be disposed generally collinear with the cable when the cable is plumb and the strongback is suspended from the end of the cable. In other words, when the strongback is freely suspended from the end of a cable which is plumb, the reference axis will be vertical.

In accordance with the preferred embodiment of the invention, the strongback is a welded assembly comprising: a plurality of rigid tubes, each tube having a square cross section; a plurality of channels for reinforcing the joints of welded tubes; and the aforementioned upper and lower couplings. In particular, the strongback in accordance with the preferred embodiment comprises mutually parallel first and second rigid linear members which are disposed parallel to the reference axis. The top of the second rigid linear member is connected to the bottom of the first rigid linear member by a relatively obliquely disposed third rigid linear member. The first, second and third rigid linear members lie in a vertical plane which is offset from the reference axis, to allow the strongback to circumvent the core spray downcorner piping. In addition, the first and second rigid linear members are offset from each other to allow the strongback to circumvent the feedwater sparger and the core spray header. The strongback must have a height sufficient to span the distance between a point above the feedwater sparger to a point below the core spray elbow, thereby allowing a shorter cable to be used. Because the cable ends at a point above the piping obstructions and the strongback circumvents the piping obstructions, the tie rod/lower spring assembly can be freely suspended from the cable without the cable or the intermediate supporting hardware bearing against the piping. Thus, the cable stays plumb and the position of the bottom of the tie rod/lower spring assembly relative to the gusset plate, to which the assembly will be anchored, can be freely adjusted by displacing the cable when the tie rod/lower spring assembly reaches its final elevation in the annulus.

DETAILED DESCRIPTION OF THE PREFERRED EMBODIMENTS

During the installation procedure, the tie rod/lower spring assembly (items 54 and 56 in FIG. 2) is lowered into the downcomer annulus 16. This is accomplished using a crane (not shown) on the refueling floor of the reactor. First, the tie rod/lower spring assembly must be raised from horizontal position on the refueling floor to a vertical position suspended from the end of the crane cable. This is accomplished by means of a tie rod adaptor which couples the upper end of the tie rod to the end of the cable. When the cable is wound, the upper end of the tie rod is lifted off the refueling floor into an upright position with all of the weight of the tie rod being supported by the cable. The tie rod/lower spring assembly can then be lowered into the annulus by unwinding the cable.

Figure 3A:
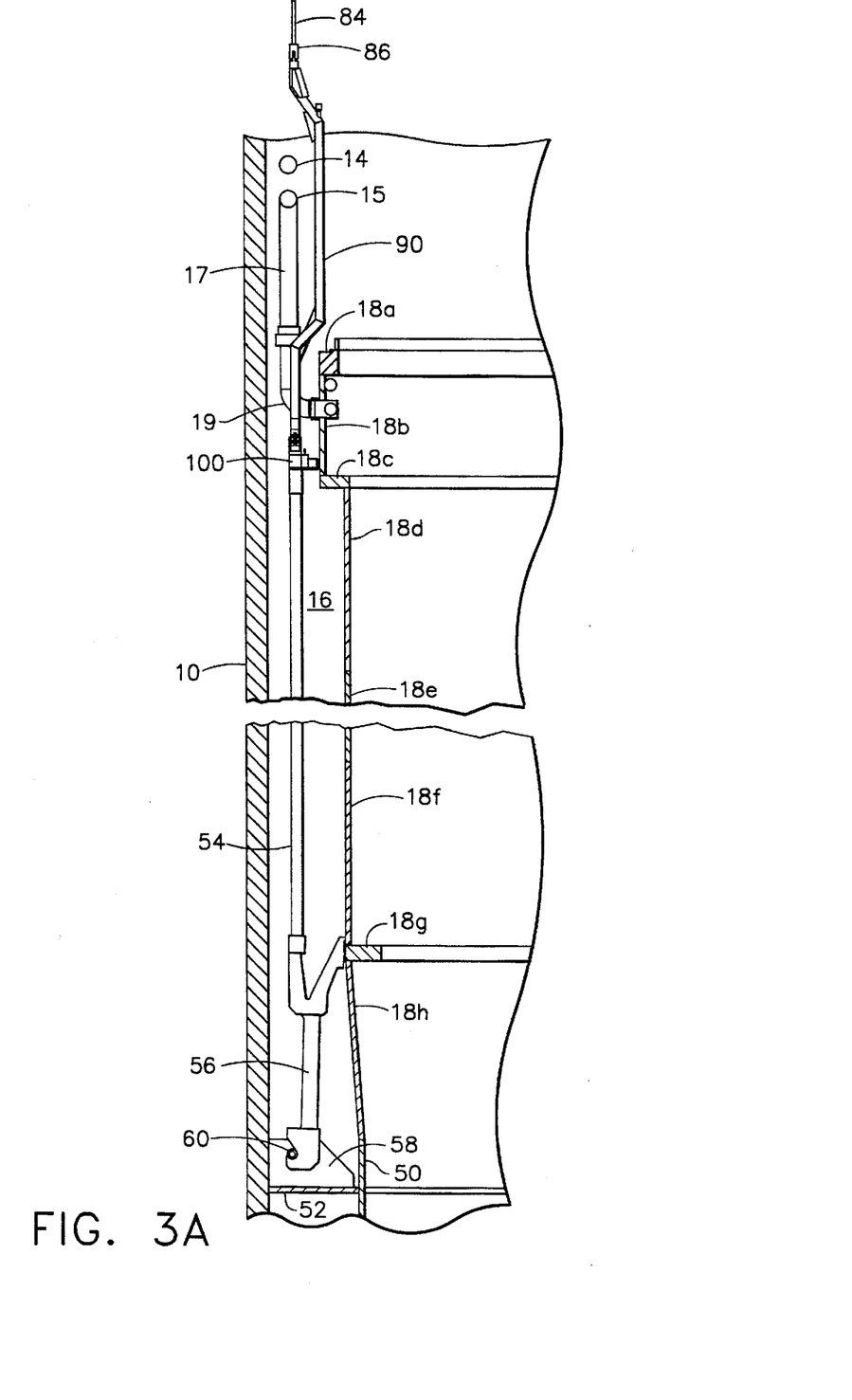
FIG. 3A is a sectional elevational view showing the position and configuration of the strongback assembly of the invention relative to the feedwater sparger and core spray header of a typical BWR.
Figure 3B:
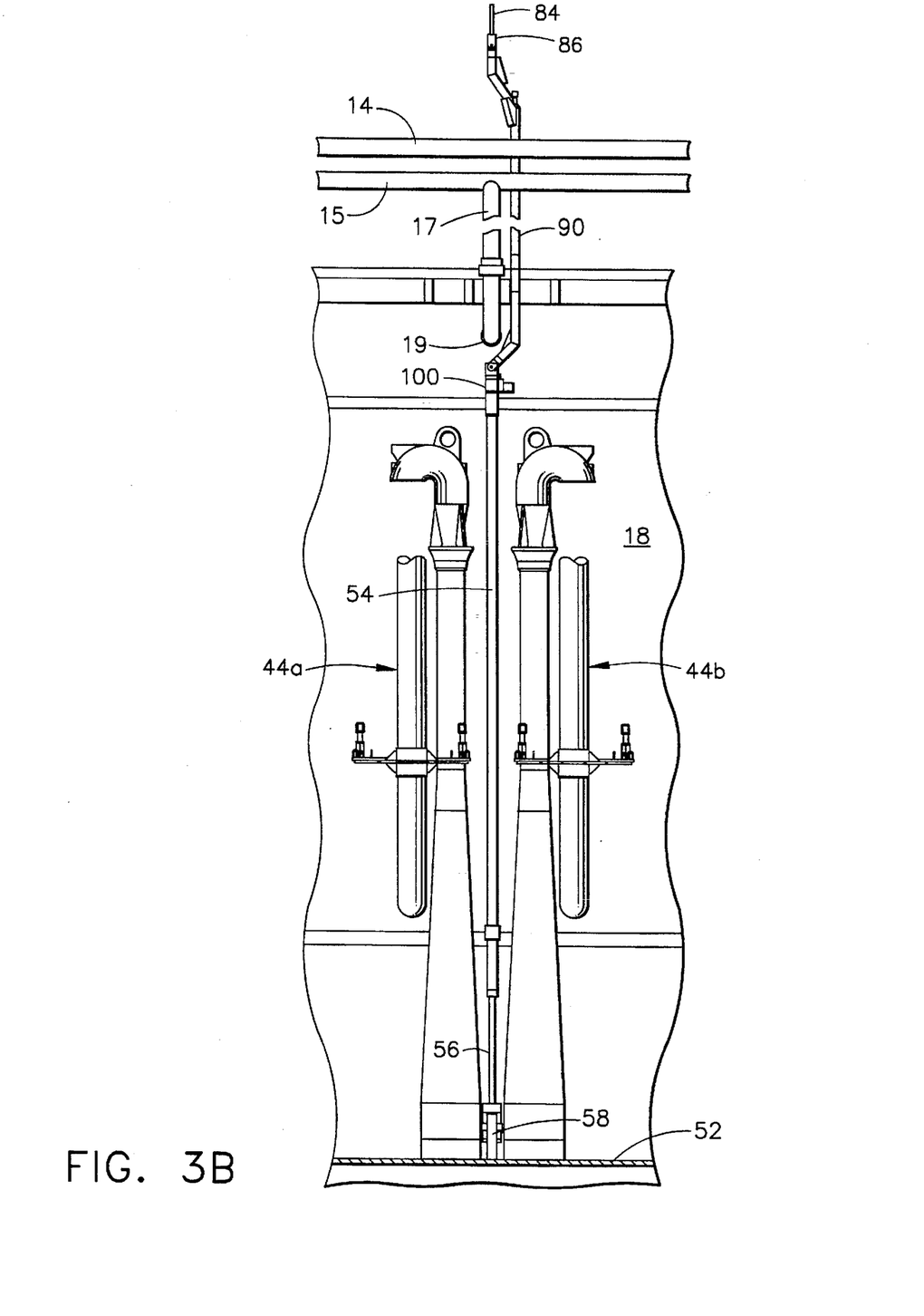
FIG. 3B is a radial elevational view showing the position and configuration of the strongback assembly of the invention relative to the jet pump assemblies and the core spray downcomer piping of a typical BWR.

Referring to FIGS. 3A and 3B, when vertical access to the downcomer annulus 16 is limited by internal reactor structures such as the feedwater sparger 14 and core spray header 15, the tie rod adaptor 100 is coupled to the end of the cable 84 via a rigid frame or strongback 90 specially designed, in accordance with the present invention, to bypass the obstruction. Maneuvering of the tie rod/lower spring assembly must be done with extreme care to avoid damaging reactor hardware such as the jet pump sensing lines.

Figure 5A:
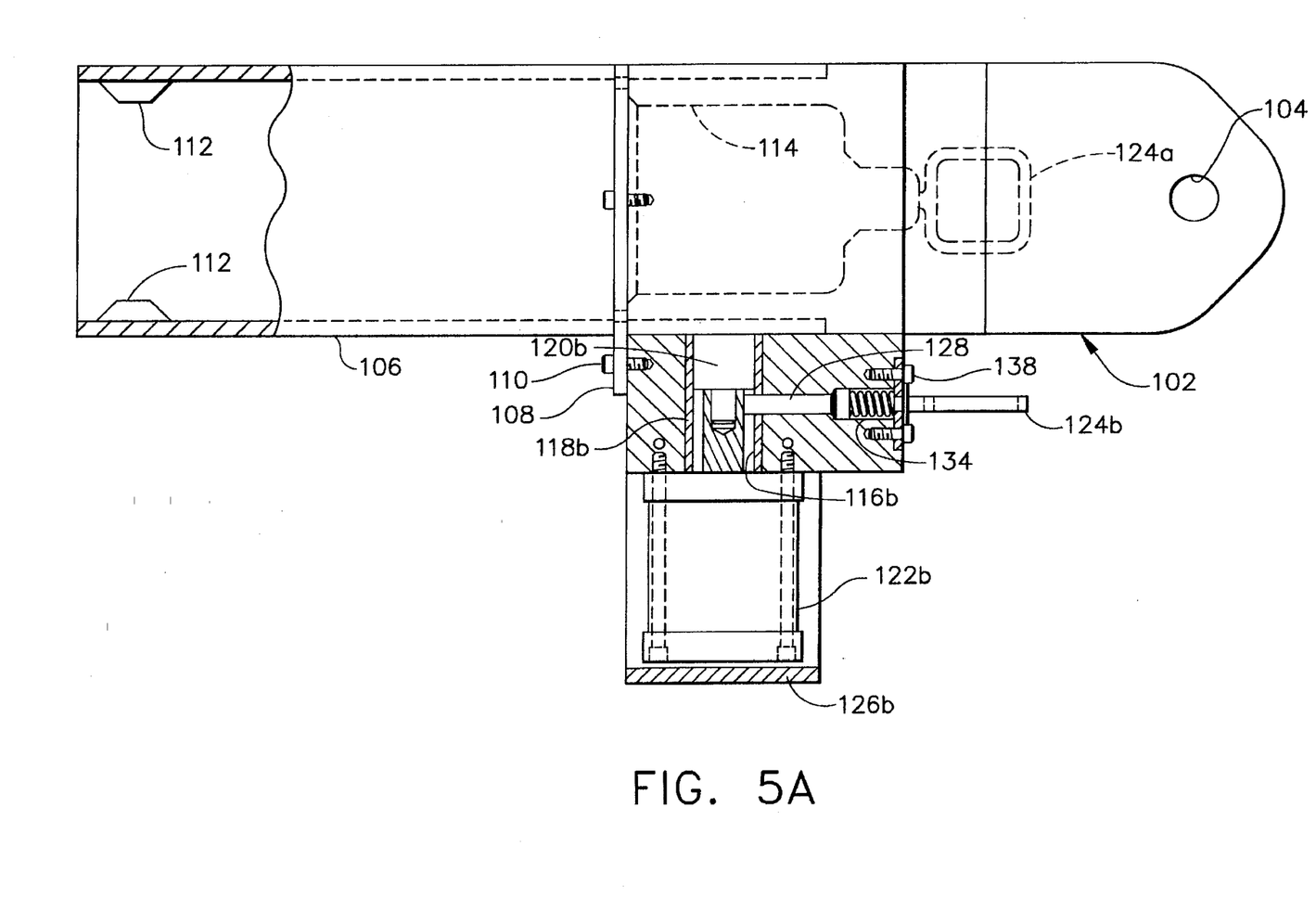
FIGS. 5A and 5B are partly sectioned elevation and plan views of a tie rod adaptor used in conjunction with the strongback of the present invention and the tie rod of FIG. 4.
Figure 5B:
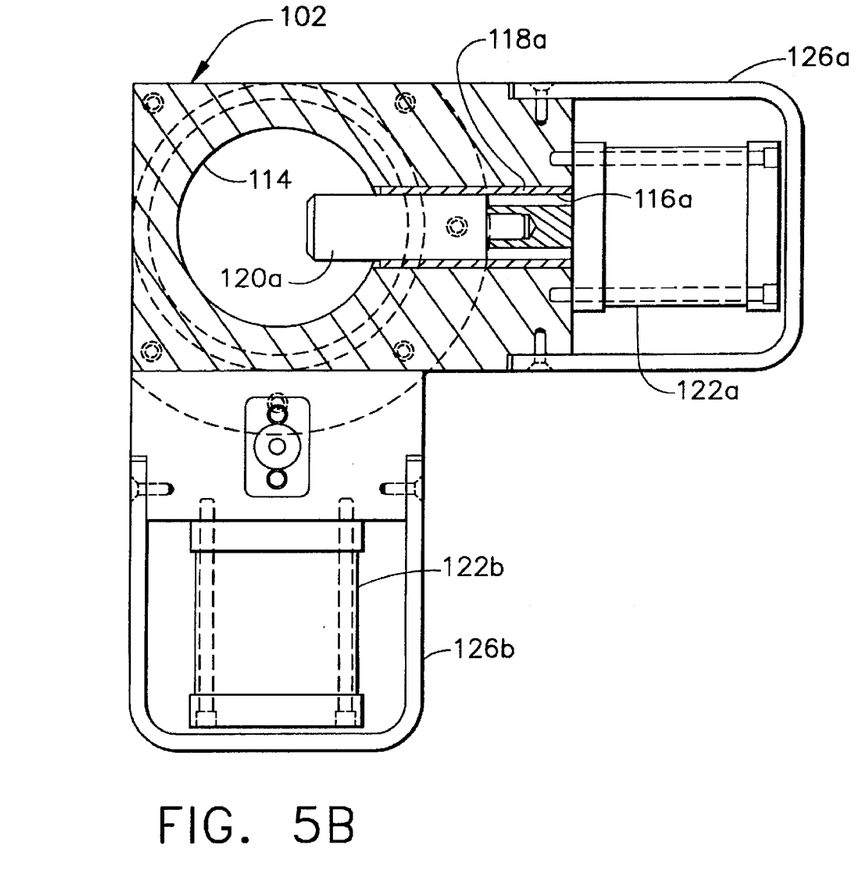

Referring to FIGS. 5A and 5B, the tie rod adaptor 100 comprises a frame 102 having a hole 104 for receiving a conventional coupling mechanism, such as a clevis pin, which must be strong enough to bear the entire weight of the tie rod/lower spring assembly. A circular cylindrical shield 106 for protecting the threads of the tie rod is connected to the frame 102 by means of a mounting plate 108.

The frame 102 has an axial recess 114 shaped for receiving the upper end of the tie rod, and a pair of circular cylindrical holes 116a and 116b which communicate with axial recess 114. Each hole 116a and 116b has a respective bushing 118a and 118b in which a respective locking pin 120a and 120b is slidably mounted. Each locking pin is slidable from a first position whereat the locking pin does not interfere with axial recess 114 to a second position whereat the locking pin interferes with axial recess 114, as seen in FIG. 5B. Each locking pin 120a, 120b slides from the interfering position to the non-interfering position in response to actuation of a respective pneumatic cylinder 122a, 122b. The piston of pneumatic cylinder 122a is connected to a reduced-diameter end of locking pin 120a; the piston of pneumatic cylinder 122b is connected to a reduced-diameter end of locking pin 120b. As best seen in FIG. 5B, each cylinder is protected against damage by a respective U-shaped cylinder shield 126a, 126b attached to frame 102 via screws.

Each locking pin 120a and 120b is disposed radially relative to the axis of the tie rod and is configured to fit with little play inside a respective one of circular cylindrical radial holes 58a and 58b formed in the topmost portion of the tie rod upper end, as shown in FIG. 4, and inside a respective one of the bushings 118a and 118b. The front end of each locking pin is chamfered to facilitate entry of the locking pin into the radial holes 58a and 58b. In the preferred embodiment, the holes 58a and 58b are mutually perpendicular, as are the locking pins 120a and 120b. Each locking pin is capable of supporting the entire weight of the tie rod, which is in excess of 1,000 pounds.

Each pneumatic cylinder is connected to a separate source of pressurized fluid via a respective pneumatic line (not shown). Each piston is retracted when pressurized fluid, e.g., air, is supplied to the cylinder and extended when the supply of pressurized fluid is cut off. When the pistons are extended, they interlock the adaptor to the tie rod via locking pins 120a and 120b which extend into tie rod holes 58a and 58b (see FIG. 4) respectively. Each cylinder has a spring return which urges the locking pins to engage tie rod holes 58a and 58b when pneumatic pressure is discontinued. As a safeguard to prevent dropping the tie rod into the annulus, each locking pin is latched in the locking position by a respective latch 128. The exposed end of each latch shaft is integrally joined with a respective eyebolt 124a and 124b. The tie rod cannot be disengaged from the lifting apparatus until each latch 128 has been manually unlatched by an operator using a handling pole to lift the eyebolts. Then pressurized fluid can be supplied to disengage the locking pins 120a and 120b from the holes in the tie rod. When both locking pins are retracted, the tie rod lifting apparatus can be disengaged from the tie rod and removed from the annulus.

Figure 6A:
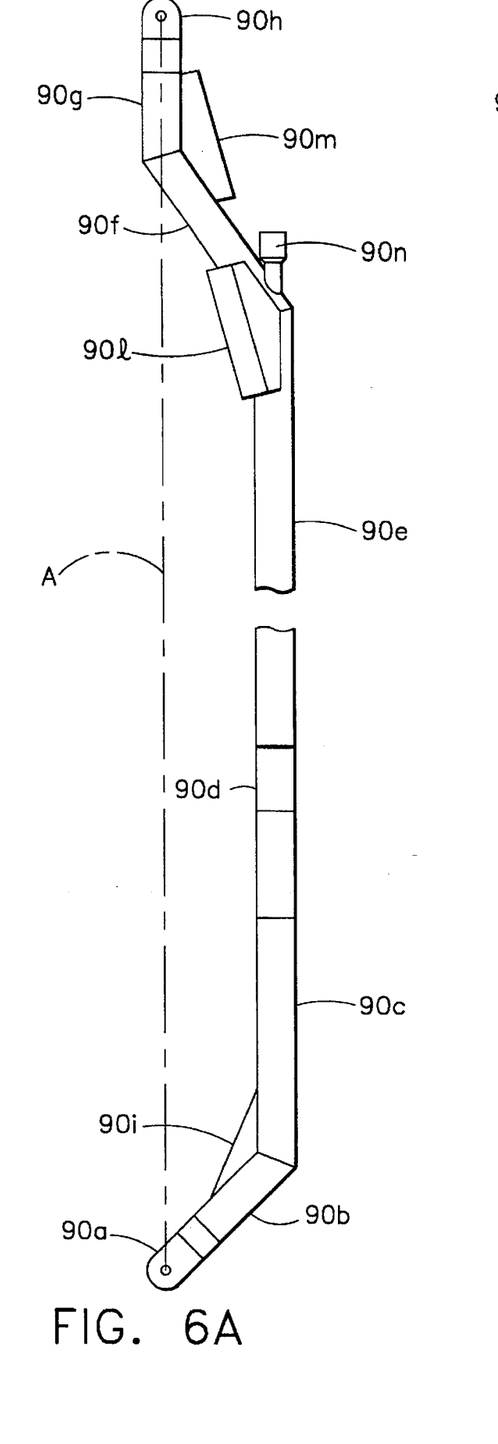
FIGS. 6A and 6B are elevation views of the strongback assembly in accordance with the preferred embodiment of the invention, the view in FIG. 6A being rotated 90° relative to the view in FIG. 6B.
Figure 6B:
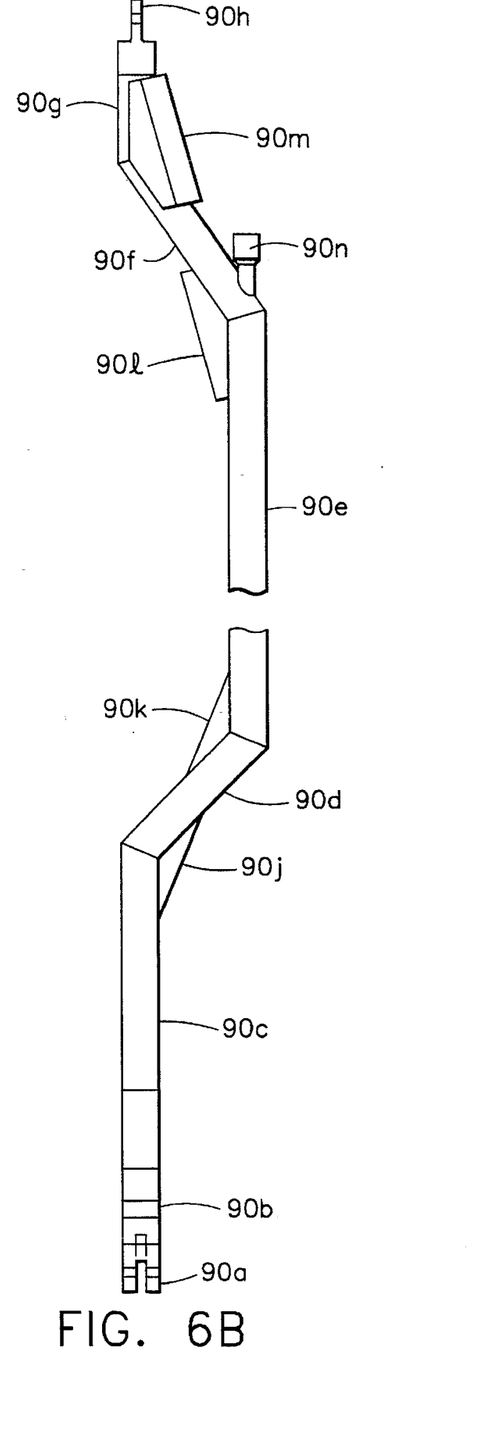

The hole 104 of tie rod adaptor 100 is coupled by a first clevis pin (not shown) to an apertured clevis 90a (see FIGS.

6A and 6B) which forms the lower end of the strongback 90. The upper end of strongback 90, in turn, has an apertured clevis 90h which is coupled by a second clevis pin (also not shown) to a cable 84 by a cable adaptor 86 (see FIGS. 3A and 3B). The strongback must have a height sufficient to span the distance between a point above the feedwater sparget 14 to a point below the core spray elbow 19, thereby allowing a shorter cable to be used. Because the cable ends at a point above and the strongback circumvents the piping obstructions, the tie rod/lower spring assembly 54/56 can be freely suspended without the supporting hardware or cable bearing against the piping. Thus, the cable stays plumb and the position of the tie rod/lower spring assembly relative to the gusset plate 58 can be freely adjusted by displacing the cable adaptor, e.g., by displacing the crane or by exerting a lateral force on the cable.

To circumvent the piping obstructions, the strongback 90 is designed to have a first rigid linear member 90c which is parallel to and offset from the reference axis A (see FIG. 6A). Strongback 90 further comprises a second rigid linear member 90e which is also parallel to and offset from the reference axis A. The rigid linear members 90c and 90e are mutually parallel and define a midsection plane. The bottom end of rigid linear member 90e is connected by a welded joint to the top end of an oblique rigid linear member 90d; the top end of rigid linear member 90c is connected by a welded joint to the bottom end of oblique rigid linear member 90d. Similarly, the bottom end of rigid linear member 90c is connected by a welded joint to the top end of an oblique rigid linear member 90b. The bottom end of rigid linear member 90b is joined to or integrally formed with the lower clevis 90a; the top end of rigid linear member 90e is connected by a welded joint to the bottom end of an oblique rigid linear member 90f. The top end of oblique rigid linear member 90f is in turn connected by a welded joint to the bottom end of a rigid linear member 90g which is coaxial with reference axis A. The top end of rigid linear member 90g is joined to or integrally formed with the upper clevis 90h. Preferably, each rigid linear member is a tube having a square cross section. Each of the welded joints connecting an oblique rigid linear member to a vertical rigid linear member is reinforced by a respective channel welded to both rigid linear members and spanning the welded joint. These reinforcing ribs bear the designations 90i–90m in FIGS. 6A and 6B.

Finally, a coupling 90n is attached to oblique tube 90f such that the axis of a hexagonal socket in the head of the coupling is generally vertical and accessible from above by a tool which can be manipulated remotely to cause the strongback 90 to rotate about reference axis A during positioning of the tie rod/lower spring assembly relative to the gusset plate.

The preferred embodiment of the strongback in accordance with the present invention has been disclosed for the purpose of illustration. Variations and modifications of the disclosed structure which fall within the concept of this invention will be readily apparent to persons skilled in the art of tooling design. For example, it will be apparent that not all tubes of the welded strongback assembly need to be straight. Nor does the tube cross section need to be square. All such variations and modifications are intended to be encompassed by the claims set forth hereinafter.

I claim:

1. A strongback comprising:

a first end member having a mating portion of a coupling, said mating portion of said first end member being generally located at a first axial position along a strongback axis;

a second end member having a mating portion of a coupling, said mating portion of said second end member being generally located at a second axial position along said strongback axis, said first and second axial positions being mutually separated by at least a first predetermined distance;

a first rigid linear member having a longitudinal axis generally parallel to said strongback axis and having first and second ends;

a second rigid linear member having a longitudinal axis generally parallel to said strongback axis and having first and second ends, said second rigid linear member being offset from said first rigid linear member by a second predetermined distance;

a third rigid linear member disposed at an oblique angle relative to said strongback axis and having a first end connected to said second end of said first rigid linear member and a second end connected to said first end of said second rigid linear member;

a fourth rigid linear member disposed at an oblique angle relative to said strongback axis and having a first end connected to said first end member and a second end connected to said first end of said first rigid linear member;

a fifth rigid linear member disposed at an oblique angle relative to said strongback axis and having a first end connected to said second end of said second rigid linear member and a second end connected to said second end member, wherein said first, second and third rigid linear members lie in a plane which is offset from said strongback axis.

2. The strongback as defined in claim 1, wherein said mating portion of at least one of said first and second end members is in the form of a clevis.

3. The strongback as defined in claim 1, wherein each connection between said members is a welded joint.

4. The strongback as defined in claim 3, wherein each said welded joint is spanned by a reinforcement rib which is welded to both of said members connected by said respective welded joint.

5. The strongback as defined in claim 1, wherein each of said rigid linear members is a metal tube having a square cross section.

6. An apparatus for suspending a component of a nuclear reactor inside a reactor pressure vessel, comprising:

a cable;

a first adaptor connected to an end of said cable;

a strongback comprising a first coupling at an upper end, a second coupling at a lower end, a midsection between said first and second couplings, first means for connecting a top portion of said midsection to said first coupling, and second means for connecting a bottom portion of said midsection to said second coupling, said first and second couplings lying along a strongback axis at first and second elevations respectively, said midsection extending between a third elevation below said first elevation and a fourth elevation above said second elevation and below said third elevation, said midsection being offset from said strongback axis along its entire extent, said first coupling being connected to said first adaptor such that said cable supports said strongback; and a second adaptor connected to said second coupling of said strongback, said second adaptor having means for connecting to and supporting said component of said nuclear reactor.

7. The apparatus as defined in claim 6, wherein said strongback midsection comprises:

a first rigid linear member having a longitudinal axis generally parallel to said strongback axis and having first and second ends;

a second rigid linear member having a longitudinal axis generally parallel to said strongback axis and having first and second ends, said second rigid linear member being offset from said first rigid linear member; and a third rigid linear member disposed at an oblique angle relative to said strongback axis and having a first end connected to said second end of said first rigid linear member and a second end connected to said first end of said second rigid linear member, wherein said first, second and third rigid linear members lie in a plane which is offset from said strongback axis.

8. An apparatus for suspending a component of a nuclear reactor from a cable, comprising:

a first adaptor for connecting to an end of the cable;

a strongback comprising a first coupling at an upper end, a second coupling at a lower end, a midsection between said first and second couplings, first means for connecting a top portion of said midsection to said first coupling, and second means for connecting a bottom portion of said midsection to said second coupling, said first and second couplings lying along a strongback axis at first and second elevations respectively, said midsection extending between a third elevation below said first elevation and a fourth elevation above said second elevation and below said third elevation, said midsection being offset from said strongback axis along its entire extent, said first coupling being connected to said first adaptor such that said first adaptor supports said strongback; and a second adaptor connected to said second coupling of said strongback such that said strongback supports said second adaptor, said second adaptor having means for connecting and supporting said component of said nuclear reactor, wherein said strongback midsection comprises:

a first rigid linear member having a longitudinal axis generally parallel to said strongback axis and having first and second ends;

a second rigid linear member having a longitudinal axis generally parallel to said strongback axis and having first and second ends, said second rigid linear member being offset from said first rigid linear member; and a third rigid linear member disposed at an oblique angle relative to said strongback axis and having a first end connected to said second end of said first rigid linear member and a second end connected to said first end of said second rigid linear member, wherein said first, second and third rigid linear members lie in a plane which is offset from said strongback axis.

9. The apparatus as defined in claim 8, wherein said second coupling comprises a clevis.

10. The apparatus as defined in claim 8, wherein said first coupling comprises an apertured plate.

11. The apparatus as defined in claim 8, wherein said first and third rigid linear members are connected by a first welded joint, and said second and third rigid linear members are connected by a second welded joint.

12. The apparatus as defined in claim 11, wherein said first welded joint is spanned by a first reinforcement rib which is welded to said first and third rigid linear members, and said second welded joint is spanned by a second reinforcement rib which is welded to said second and third rigid linear members.

13. The apparatus as defined in claim 8, wherein each of said first, second and third rigid linear members is a metal tube having a square cross section.

* * * * *